May 29, 1928. 1,671,304
T. MIDGLEY
MOLD STRIPPING APPARATUS
Filed June 29, 1925 3 Sheets-Sheet 1
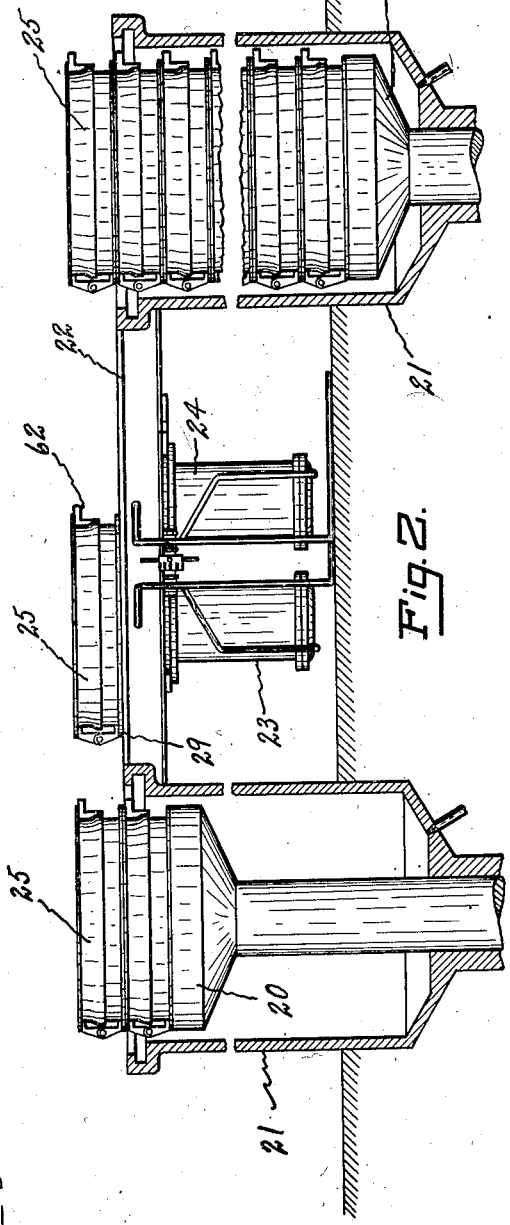
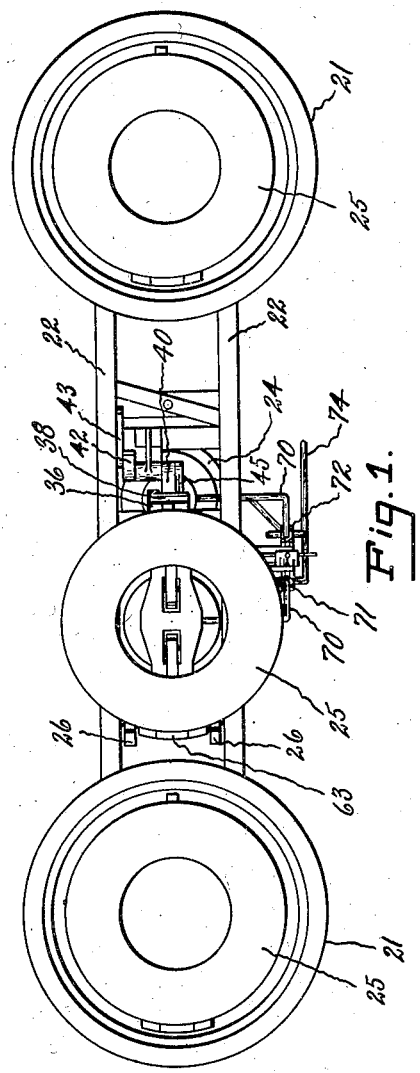
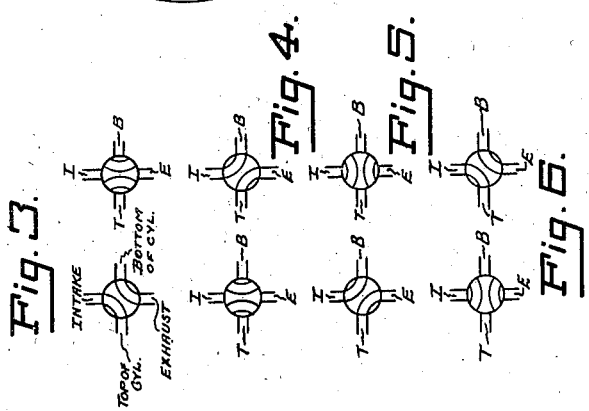
INVENTOR.
Thomas Midgley
BY
Edward C. Taylor
ATTORNEY.

May 29, 1928. 1,671,304
T. MIDGLEY
MOLD STRIPPING APPARATUS
Filed June 29, 1925 3 Sheets-Sheet 2
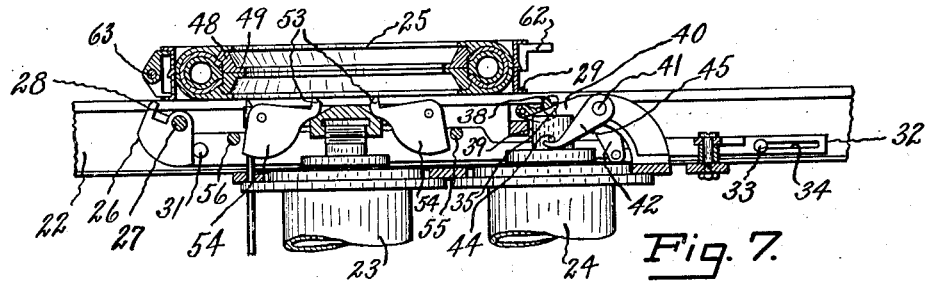
Fig. 7.
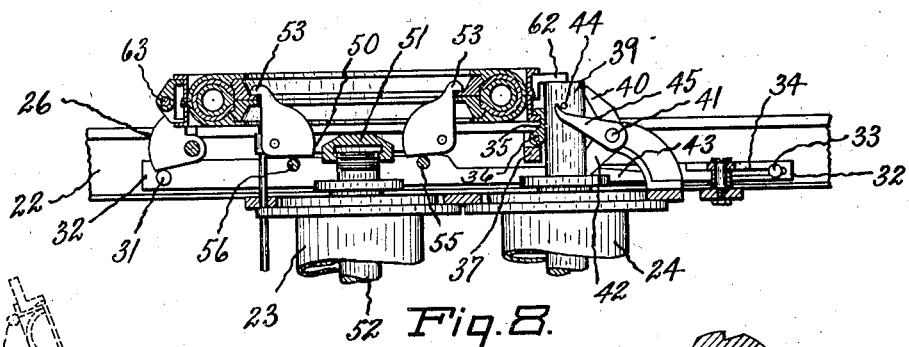
Fig. 8.
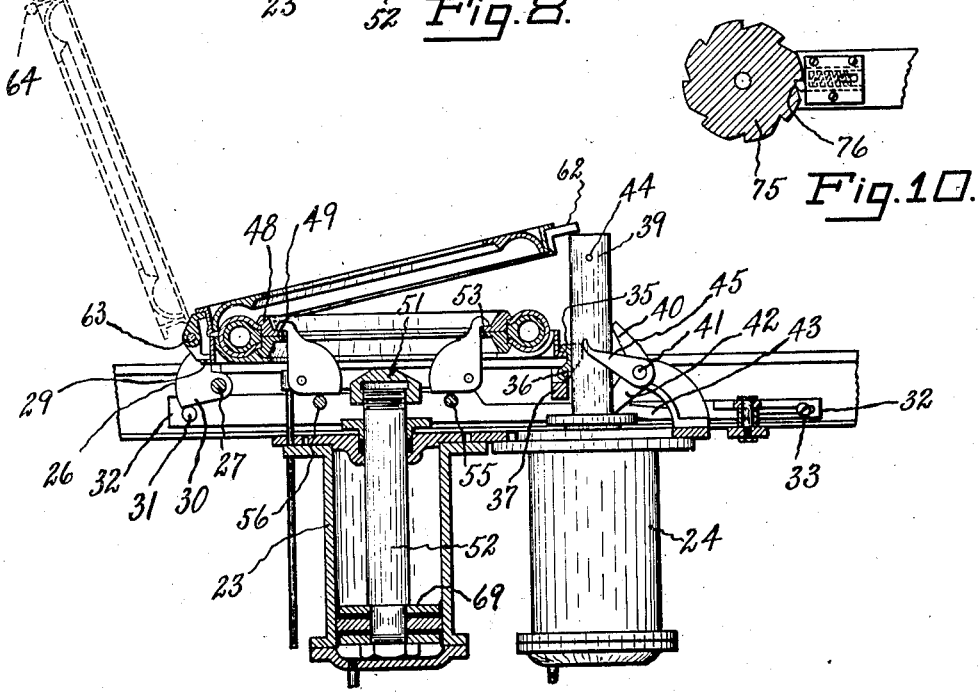
Fig. 9.
Fig. 10.
INVENTOR.
Thomas Midgley
BY
Edward Taylor
ATTORNEY.

May 29, 1928. 1,671,304
T. MIDGLEY
MOLD STRIPPING APPARATUS
Filed June 29, 1925  3 Sheets-Sheet 3

INVENTOR.
Thomas Midgley
BY
Edward C. Taylor
ATTORNEY.

Patented May 29, 1928.

1,671,304

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

MOLD-STRIPPING APPARATUS.

Application filed June 29, 1925. Serial No. 40,250.

This invention relates to apparatus for opening molds in which tire casings have been vulcanized, and for stripping the tires therefrom. It has for its object a machine of this general character which will perform rapidly the necessary operations on a tire mold and which will require no complexity of parts. It has for a particular object the provision of an apparatus which will strip a tire from the mold by a tilting action as distinguished from a straight pull. Other and further objects will appear from the description and claims. While the apparatus has been shown as especially adapted to a hinged sheet metal mold, and finds particular applicability in such use, it is not limited to molds of this type.

Referring to the drawings,

Fig. 1 is a plan view of the apparatus adapted for opening and stripping molds during their travel on a trackway from one heater to another;

Fig. 2 is a side elevation thereof;

Fig. 3 is a diagrammatic view of the two operating valves, showing their relative positions in one stage of the operation of the device;

Figs. 4 to 6 are similar views of the valves at other stages;

Fig. 7 is a sectional elevation of the apparatus, showing a mold ready for the initiation of the stripping operation;

Fig. 8 is a similar view showing the action of the clamps;

Fig. 9 is a similar view, showing a somewhat larger section of the device, and showing the top half of the mold stripped from the tire;

Fig. 10 is a detail of a control for the operating valves;

Figure 11:
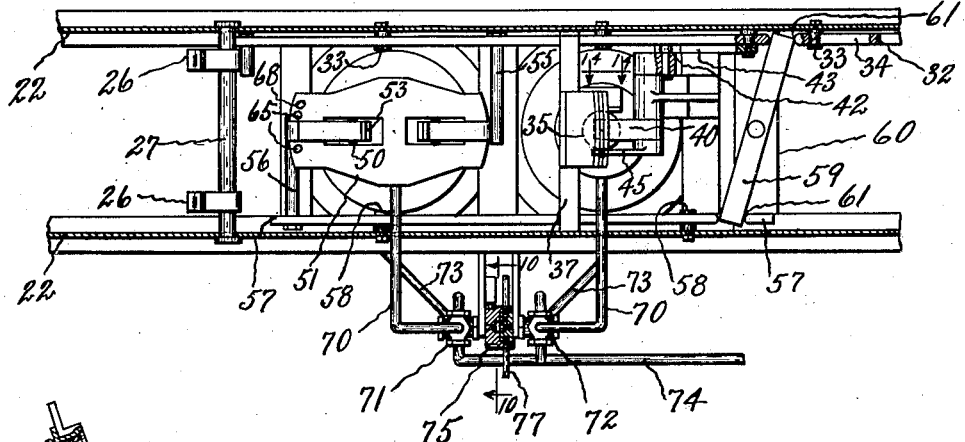
Fig. 11 is a plan view of the apparatus, certain parts being broken away.

The apparatus has been shown in the drawings as mounted between two vulcanizing heaters of the usual type comprising a ram 20 mounted for vertical movement in a casing 21. Connecting the casings of the heater are tracks 22 upon which the molds may be slid in passing from one heater to the other. Located under these tracks are two spaced pressure cylinders 23 and 24. On the tracks directly above the former of these, the molds 25 are placed successively for stripping. All the mechanism to be described has an inactive position below the level of the tracks, so that there will be no interference with the travel of the molds as they are slid into and out of stripping position. During the operation of the device, however, the molds are held firmly in position by certain gripping devices.

At one side of the mold as it rests on the track above cylinder 23 are a pair of grippers 26 (Figs. 1, 7, and 11), both fixed to a common shaft 27 pivoted in the tracks 22. These grippers have recesses 28 adapted to receive the lower outer flange 29 of the mold when they are swung upwardly as in Fig. 8, and have a weighted portion 30 which causes them to return to the position of Fig. 7 when the elevating force is removed. Elevation of these grippers is accomplished by a pin 31 mounted on a sliding bar 32 held to one of the tracks 22 by headed pins 33 passing through slots 34 in the bar. When this bar is moved toward the left in the figures by mechanism to be described the pin 31 strikes against the edge of the weighted portion 30 of one of the grippers, and rocks it into the position of Fig. 8. Since both grippers are fixed to shaft 27 they will move simultaneously, gripping the flange 29 of the mold at spaced points.

Another gripper for holding flange 29 is shown at 35, this being pivoted to a short shaft 36 mounted in a recess in a bar 37 extending between the tracks. This gripper has a portion 38 adapted to overlie the flange 29, and is curved on its rear side to fit the side of piston rod 39 of cylinder 24. As in the case of grippers 26, the gripper 35 is so balanced that it will turn to the inactive position of Fig. 7 unless it is positively held upright. The holding force in this case is exerted by the piston rod 39, which, as it rises from the position of Fig. 7 to that of Fig. 8, bears directly against the gripper 35 to raise it.

Figure 14:
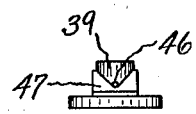
Fig. 14 is a detail elevation taken on line 14—14 of Fig. 11.
Figure 13:
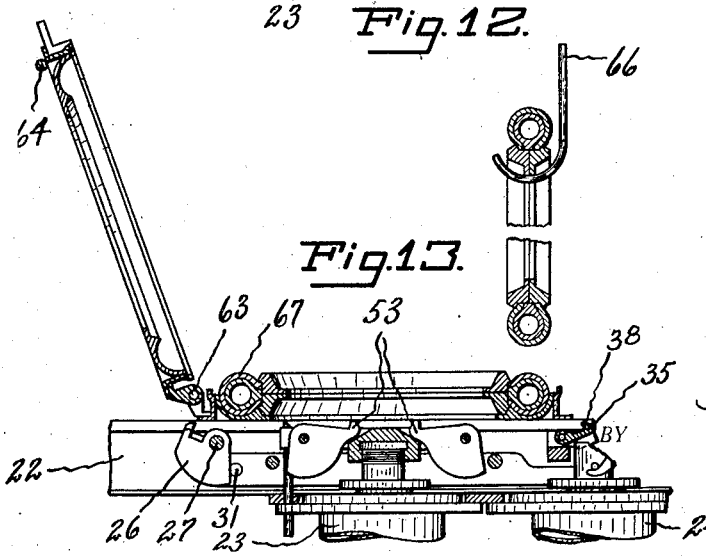
Fig. 13 is a similar view showing the removal of the vulcanized tire and the placing of an uncured tire in the mold.

During this same motion of piston rod 39 it tilts an arm 40 which, in the relation of parts shown in Fig. 7, rests on its top, and raises it to the position shown in Fig. 8. This arm is fixed on a shaft 41 which carries at its end a crank 42 (Fig. 11) joined by a link 43 with bar 32 previously referred to as the operating means for grippers 26. As the piston rod 39 rises the arm 40 is tilted from the position of Figs. 7 and 11 to that of Fig. 8, causing the bar 32 to be moved to the left as viewed in the drawings (compare Figs. 7 and 8). The operation of grippers 26 and 35 is thus accomplished substantially simultaneously. To rock the shaft 41 in the opposite direction during the lowering of rod 39, the latter has fixed to it on one side a laterally projecting pin 44 which contacts with a second arm 45 on shaft 41. Some means of insuring that the piston rod will stay in alignment, thereby keeping pin 44 in registry with the end of arm 45, is preferably provided. In the case shown this is accomplished by a second pin 46 (Fig. 14), on the opposite side of the rod from pin 44, which as the rod descends enters a V-shaped notch in an abutment 47. The piston rod is by this means centered at the completion of each stroke.

In the case shown the beads of the tire are held during vulcanization by a pair of bead rings 48, which are of the usual type having inwardly projecting flanges 49. Provision has been made for gripping this device in order to hold the tire in the lower half of the mold while the upper half is being forced away. With tires of certain patterns there may be a natural tendency to remain in one half sufficient to permit the omission of special gripping devices for compelling it so to remain. In such cases the mechanism to be described may not be needed, but it is preferably provided as tires not of this type may be dealt with.

The grippers for holding the bead rings are of the same general type as grippers 26. They are carried in slots 50 in a plate 51 mounted on the top of the piston rod 52 associated with cylinder 23. They have hook-like portions 53 and are weighted at 54 so that they tend by gravity to assume the position in which they are shown in Fig. 7. To move them from this position to cause them to grip the flanges of the bead rings, pins 55 and 56 are provided, the former being mounted on bar 32 previously referred to, and the latter on a bar 57 (Fig. 11) similar to it but mounted by headed pins 58 on the opposite track. Bars 32 and 57 are connected together for simultaneous longitudinal motion in opposite directions by a lever 59 pivoted at its center to a cross-bar 60, and fitting at its ends into notches 61 cut in the bars. The relative motion of pins 55 and 56, and their effect on the grippers, will be seen from a comparison of Figs. 7 and 8. This motion is accomplished by the upward motion of piston rod 39 as previously mentioned.

Further upward motion of piston rod 39 causes its end to strike a lug 62 (Fig. 9) on the upper half of the mold, tilting the latter upwardly and stripping it from the tire. The two halves of the mold are preferably hinged together at 63, but this is for convenience only and the apparatus will operate with molds of other designs. From the full line position of Fig. 9 the upper mold half is turned by hand into the dotted line position, where it rests against a cross-bar 64; or, in case an unhinged mold is used, the upper half is removed. In either case it is moved out of the way of succeeding stripping operations.

Figure 12:
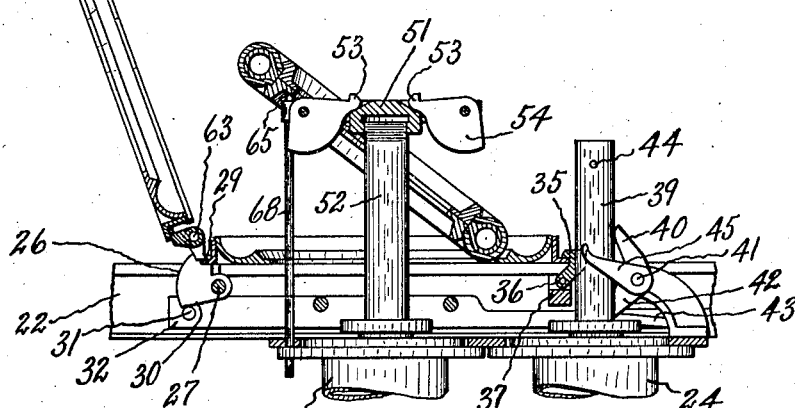
Fig. 12 is a view similar to Fig. 7 but showing the tire stripped from the bottom half of the mold.

The next action of the apparatus is the stripping of the tire from the lower mold half. In the performance of this function the piston rod 52 is caused to rise. In so doing it lifts the weighted portions 54 of the bead ring grippers off from the pins 55 and 56, which remain stationary. The hooked portions 53 are by the same motion raised clear of the bead rings, so that the grippers are automatically returned to inactive position by gravity. Further upward motion of the piston rod causes pins 65 (Fig. 12) on the plate 51 to contact with the bead ring on one side. The other side of the plate is made of less radius so as to clear the bead ring, and the latter, together with the tire, is thereby tilted upwardly, preferably but not necessarily in the opposite direction from the tilt given to the upper mold half in rising. The tire is pulled entirely clear of the mold by this operation, and may be carried away on a suitable hook 66, while a fresh tire 67 is placed in the mold after lowering the two piston rods. On closing the mold it may be slid along the tracks to the heater, being loaded, it being completely freed of all restraint by the grippers on the descent of the pistons. A rod 68 keeps the plate 51 in proper alignment during its travel.

The machine has now been completely described with the exception of the control devices, and the means for raising and lowering the piston rods. While these have been described in terms of fluid pressure devices it will be obvious that other motive power may be employed if desired. Control mechanism, however, will be described for the fluid pressure type of operating means, this being preferred as combining simplicity with avoidance of breakage in case of undue sticking of the tire or other accidental interference with the operation. Each piston rod had a piston 69 (Fig. 9) of the usual type, running freely in its cylinder and packed in the ordinary manner. From the top of cylinders 23 and 24 pipes 70 (Fig. 11) lead to the ports T (Fig. 3) of valves 71 and 72 respectively. Pipes 73 from the bottom of the cylinders lead to ports B in these valves. Air under pressure is brought to ports I of the valves by a pipe 74, while air is permitted to escape from the cylinders when desired through a port E. The valves 71 and 72 are of the usual four-port type, in which the rotating part of the valve is designed to couple together simultaneously two pairs of adjacent ports.

The operation of the valves is shown in Figs. 3 to 6, representing a complete cycle of the machine, performed in a half revolution of the valves. Preferably the two valves are connected so that they always rotate together, their shafts being joined by a ratcheted hub 75 (Fig. 10) coacting with a stationary pawl 76 and having a handwheel or spokes 77 (Fig. 11). The eight teeth on the ratchet divide the rotation of the valves into two complete cycles of four positions each. In the first position (Fig. 3) the valve 71 is admitting air to the top of cylinder 23 and exhausting air from its bottom. Valve 72 is closed. The position of parts corresponding to the valve setting of Fig. 3 is that of Fig. 7, where the mechanism is entirely inactive. The first active step is accomplished by rotating the valves to the position of Fig. 4, in which air is introduced at the bottom of cylinder 24 through valve 72, valve 71 being closed. This raises piston rod 39 through the position of Fig. 8 to that of Fig. 9, first setting all the gripping devices and then stripping the top half of the mold. The second step is accomplished by a further one-eighth revolution of the valves, as indicated in Fig. 5. This shuts off valve 72, leaving the piston rod 39 held in its upper position, and admits air under the piston in cylinder 23. The consequent elevation of piston rod 52 first releases the bead ring grippers and then forces the tire out of the lower mold half. The next two valve actuations, shown in Figs. 6 and 3, simply restore the parts to the inactive position of Fig. 7.

Having thus described my invention, I claim:

1. In a device for stripping tires from annular molds, means for holding the lower part of the mold, means for holding the tire, and means acting at one side of the outer periphery of the upper part on the mold for forcing it away from the tire with a tilting motion.

2. In a device for stripping tires from annular molds, means for stripping one part of the mold from the tire by a tilting motion, and means for stripping the tire from the lower half of the mold by a tilting motion in the opposite direction.

3. In a device for stripping tires from circumferentially split annular molds, a pair of spaced movable members, one of which is adapted to engage the inner periphery of the tire and the other of which is adapted to engage the outer periphery of the upper half of the mold, means for holding the lower mold half in a position encircling the first-named member, and means for moving said members successively.

4. In a device for stripping tires from circumferentially split annular molds, a pair of spaced movable members, one of which is adapted to engage the inner periphery of the tire and the other is adapted to engage the outer periphery of the upper half of the mold, means for holding the lower half of the mold in a position encircling the first-named member, means for holding the tire to the lower half of the mold until after the actuation of the second-named member, and means for moving the members successively.

5. In a device for stripping tires from circumferentially split annular molds, a pair of spaced pneumatic cylinders, pistons and piston rods in each, means to support a mold coaxially with one of the cylinders and in position to have the outer periphery of its upper half in the path of the piston rod of the second cylinder, gripping devices actuable by the motion of the piston rod of the second cylinder for holding the lower half of the mold, and additional gripping devices actuable by the motion of the piston rod of the second cylinder for holding the tire in the lower half of the mold and releasable by the motion of the piston rod of the first cylinder, the piston rod of the first cylinder carrying an abutment adapted to contact with the inner periphery of the tire and push it from the lower half of the mold.

6. In a device for stripping tires from circumferentially split annular molds, a pair of spaced pneumatic cylinders, pistons and piston rods in each, means to support a mold coaxially with one of the cylinders and in position to have the outer periphery of its upper half in the path of the piston rod of the second cylinder, gripping devices actuable by the motion of the piston rod of the second cylinder for holding the lower half of the mold, the piston rod of the first cylinder carrying an abutment adapted to contact with the inner periphery of the tire and push it from the lower half of the mold.

THOMAS MIDGLEY.